(No Model.)
J. M. WALKER.
SELF OILING SPINDLE.
No. 593,867. Patented Nov. 16, 1897.
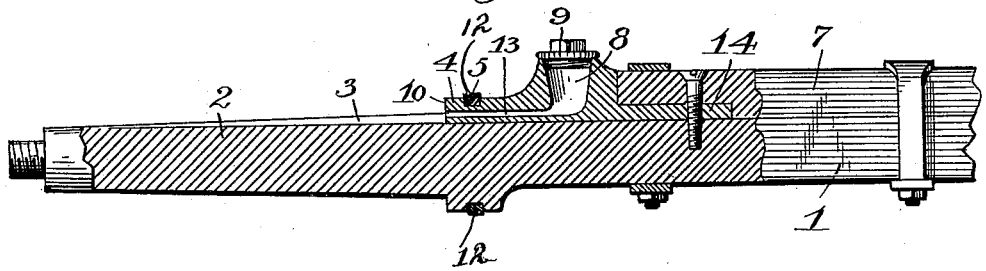
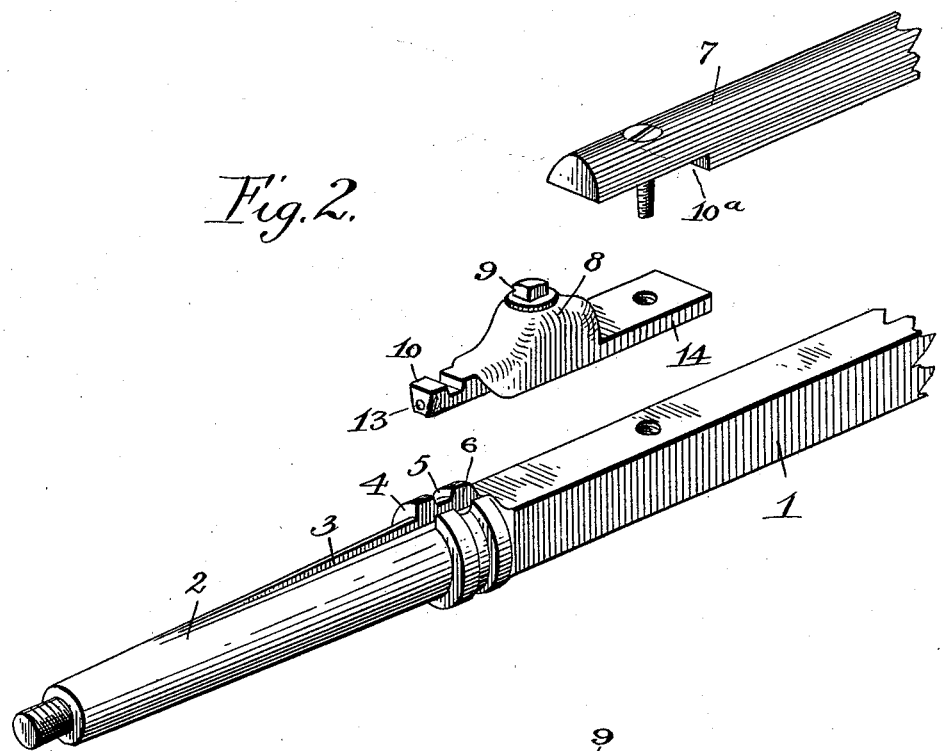
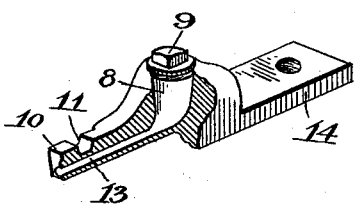
WITNESSES
J. Frank Culverwell
C. D. Kesler
INVENTOR
John M. Walker.
By John Wedderburn
Attorney

UNITED STATES PATENT OFFICE.

JOHN M. WALKER, OF CONVERSE, INDIANA.

SELF-OILING SPINDLE.

SPECIFICATION forming part of Letters Patent No. 593,867, dated November 16, 1897.

Application filed January 7, 1897. Serial No. 618,396. (No model.)

*To all whom it may concern:*

Be it known that I, JOHN M. WALKER, a citizen of the United States, residing at Converse, in the county of Miami and State of Indiana, have invented certain new and useful Improvements in Self-Oiling Spindles; and I do hereby declare the following to be a full, clear, and exact description of the invention, such as will enable others skilled in the art to which it appertains to make and use the same.

This invention relates to self-oiling spindles, and has for its object to provide, in connection with the usual spindle of a carriage, wagon, or other vehicle, an oil cup or reservoir which is mounted upon the axle in a novel and secure manner and which communicates with a longitudinal groove in the spindle, whereby the lubricant may be supplied to said spindle throughout its entire bearing-surface. The oil cup or reservoir is also provided with a detachable cap, whereby the supply of oil may be replenished whenever necessary.

The invention consists in certain novel features and details of construction, as hereinafter fully described, illustrated in the drawings, and pointed out in the claims.

In the accompanying drawings, Figure 1 is a longitudinal section through a portion of an axle and spindle, showing the improved oil-cup applied thereto. Fig. 2 is a perspective view of the same parts. Fig. 3 is a detail perspective view of the oil-cup *per se.*

Similar numerals of reference designate corresponding parts in the several figures of the drawings.

Referring to the drawings, 1 designates an axle, and 2 the spindle thereof, which is made tapering from its inner toward its outer end, being largest at its inner end, as in the ordinary construction. The spindle 2 is provided on its upper side with a longitudinal groove 3 for conducting the oil from the oil-cup, hereinafter described, the whole length of the spindle, so that the same may be distributed equally thereon and to all parts thereof. At the junction of the axle proper with the spindle portion is a collar 4, provided with an annular groove 5 and cut away or recessed, as indicated at 6 in line with the groove 3, to receive a projecting portion of the oil-cup.

7 designates the axle-cap, and 8 the oil-cup. The oil-cup 8 is placed upon the axle just within the collar 4 and may be of any desired size or capacity for holding the desired amount of oil or lubricating material. The cavity in which the lubricating material is placed is disposed vertically and is closed by means of a threaded cap 9, which screws into the upper internally-threaded end of the oil-cavity, the said cap having a polygonal or milled head, which may be engaged with a wrench or by hand for effecting its removal when necessary to replenish the supply of oil. The oil-cup 8 is provided with an outwardly-projecting longitudinal wedge-shaped portion 10, which lies in the recess 6 in the collar 5, just fitting said recess and being also provided upon its top surface with a depression 11, forming a continuation of the annular groove 5. By means of this arrangement a metal band 12 may be passed around the collar 4 and within the groove 5 and depression 11 in the oil-cup, and when the ends of said band are united it will serve to retain the other portion of the oil-cup securely in place. This outwardly-extending portion of the oil-cup is provided with a longitudinal bore or passage 13, whereby the oil is conducted from the oil-cavity to the longitudinal groove 3 in the spindle. The oil-cup 8 also has an inwardly-extending flange or portion 14 projecting longitudinally of the axle 1 and lying between said axle and the axle-cap 7, the latter being purposely cut away, as indicated at 10$^a$, and so as to overlap the portion 14, a screw or other suitable fastener being then passed through the cap 7 and portion 14 and into the axle 1 for the purpose of securing the inner end of the oil-cup firmly to the axle.

The construction above described is applicable to buggies, carriages, wagons, carts, busses, and all kinds of vehicles, and will enable the spindles to be oiled without the necessity of taking off the wheels. In addition to the convenience afforded by the oil-cup a great saving of time is effected in large establishments where a great number of vehicles are rented.

By the construction above described the oil may be supplied to the spindle without soiling the hands or clothing.

Instead of the screw for securing the inner end of the oil-cup the latter may be held by the usual axle-clip.

Having thus described the invention, what is claimed as new, and desired to be secured by Letters Patent, is—

1. The combination with an axle, a spindle, and an enlarged collar arranged at the junction of the axle and spindle and provided with an annular groove and with a wedge-shaped recess, of an oil-cup fitted upon the axle and provided with an outwardly-extending wedge-shaped portion fitting in the recess of said collar and provided with a depression in its outer surface, the said wedge-shaped portion having a longitudinal bore or passage for the oil, and a band fitting around the grooved collar and also engaging the depression in the oil-cup, substantially as described.

2. The combination with an axle, a spindle, and an enlarged collar arranged at the junction of the axle and spindle and provided with an annular peripheral groove and with a recess opening out at the periphery thereof, of an oil-cup fitted upon the axle and provided with an outwardly-extending portion fitting in the recess of said collar and provided with a depression in its outer surface registering with the groove in the collar, said outwardly-extending portion being provided with a bore or passage for the oil, and a band fitted around the grooved collar and also engaging said depression in the oil-cup, substantially as described.

In testimony whereof I have signed this specification in the presence of two subscribing witnesses.

JOHN M. WALKER.

Witnesses:
E. A. SMITH,
J. A. PHILLIPS.